Dec. 3, 1968     J. HALLER     3,414,303

COMPOSITE SINTERED POWDERED MATERIAL WORKPIECE

Original Filed April 24, 1964     2 Sheets-Sheet 1

INVENTOR.
JOHN HALLER
BY Barthel & Bugbee

ATTORNEYS

Dec. 3, 1968    J. HALLER    3,414,303
COMPOSITE SINTERED POWDERED MATERIAL WORKPIECE
Original Filed April 24, 1964    2 Sheets-Sheet 2
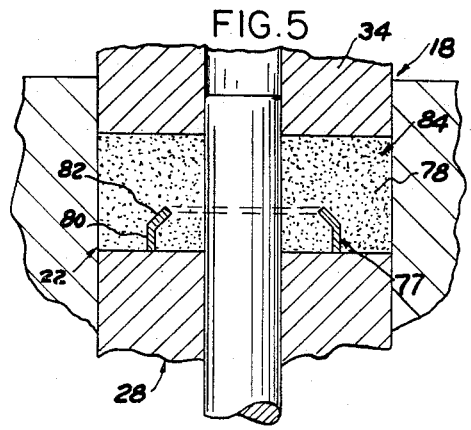
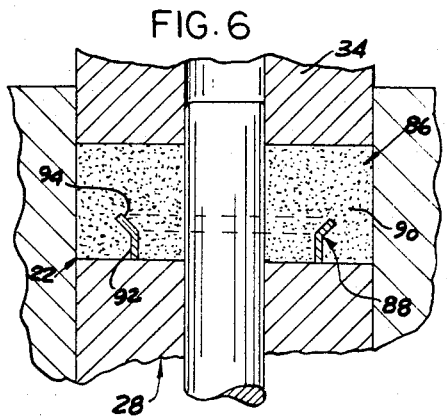
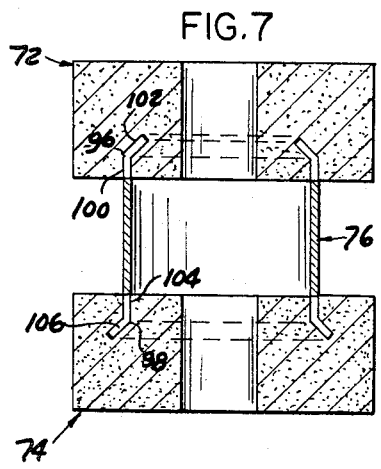
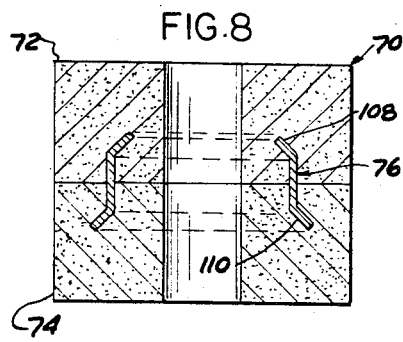
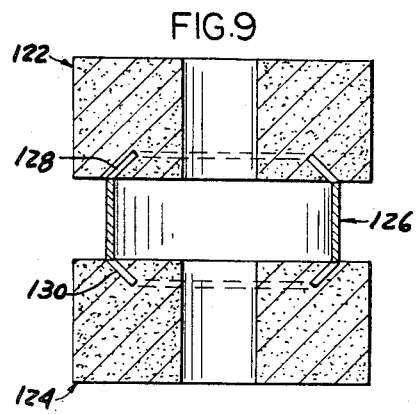
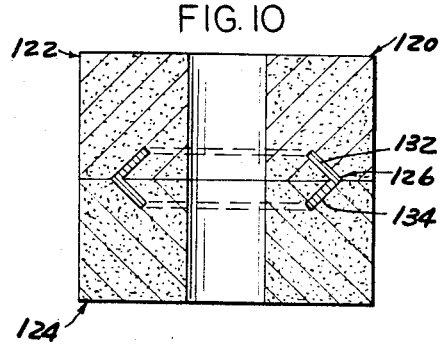
INVENTOR.
JOHN HALLER.
BY Barthel & Bugbee
ATTORNEYS ID 3,414,303
Patented Dec. 3, 1968

1

3,414,303
COMPOSITE SINTERED POWDERED
MATERIAL WORKPIECE
John Haller, Northville, Mich., assignor to Haller
Incorporated, Northville, Mich., a corporation of
Michigan
Original application Apr. 24, 1964, Ser. No. 362,317, now
Patent No. 3,320,663. Divided and this application
Feb. 8, 1967, Ser. No. 614,608
5 Claims. (Cl. 287—104)

ABSTRACT OF THE DISCLOSURE

A coupled composite sintered powdered material article consisting of a plurality of components abutting one another and containing recesses of undulatory or zigzag longitudinal section in which are seated the opposite ends of a correspondingly-configured coupling member.

This is a division of my copending application Ser. No. 362,317, filed Apr. 24, 1964 for Method of Joining Sintered Bodies by Deformable Couplings, and is directed to the article claims thereof.

Background of the invention

The field of the invention is that of powder metallurgy, Class 75 Metallurgy, subclass 200, and has particular reference to indented subclass 208, Compound Articles and also to class 29, Metal Working, subclass 180, Metal Stock, Blanks or Indeterminate Articles, and indented subclass 182, Sintered and subclass 182.2 Composite Structure.

The only known prior art is that cited as pertinent but not applied by the examiner in the above-mentioned parent application, as follows: 1,367,134, Hachmann, Feb. 1, 1921; 2,863,185, Riedi, Dec. 9, 1958; 2,870,881 Rogge, Jan. 27, 1959.

Summary of the invention

The invention consists of a coupled composite sintered powdered material article, as set forth above in the Abstract of Disclosure, and is accomplished by the joining of separate sintered powdered material parts by simple and effective mechanical operations after these parts have been previously prepared with coupling recesses of undulatory or zigzag longitudinal section during the molding or briquetting operation.

In the drawings:

FIGURE 5 is a view similar to FIGURE 1 but showing a fusible core of inwardly-tapered configuration embedded in a powdered material fill subsequent to briquetting;

FIGURE 6 is a view similar to FIGURE 3, wherein the fusible core is of outwardly-flared configuration;

FIGURE 7 is a central vertical section through the two recessed sintered powdered material components formed by sintering the briquettes of FIGURES 5 and 6 and aligning them vertically with one another, the cores having disappeared by infiltration, with a coupling sleeve aligned with the recesses prior to pressing;

FIGURE 8 is a central vertical section of the assembly of FIGURE 7 after the component parts have been pressed together, with the coupling sleeve deforming into the shapes of the oppositely-tapered recesses;

FIGURE 9 is a view similar to FIGURE 7 of a modification wherein both recesses are tapered inwardly toward the center line or axis, with a coupling sleeve placed in alignment therewith; and FIGURE 10 is a central vertical section of the assembly of FIGURE 9 after the component parts have been pressed together with the coupling sleeve deforming into the shapes of the oppositely-tapering recesses.

Figure 3:
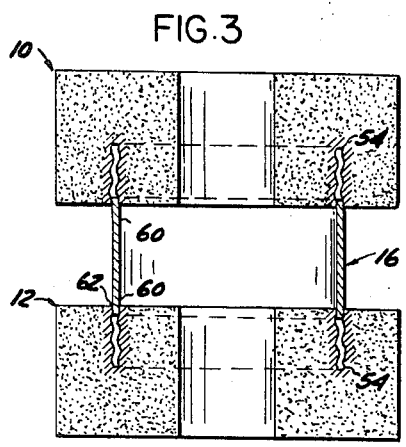
FIGURE 3 is a central vertical section through a pair of recessed sintered powdered material components and a coupling ring in their assembled and aligned condition immediately prior to pressing together.
Figure 4:
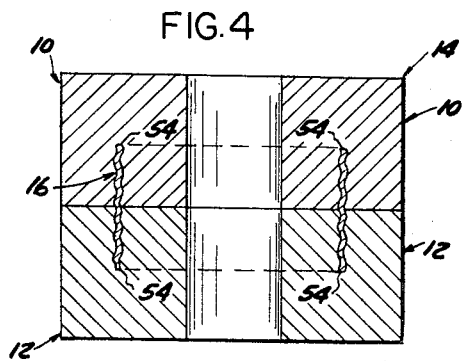
FIGURE 4 is a view similar to FIGURE 3, but showing the positions of the parts after coupling.

Referring to the drawings in detail, FIGURE 3 shows a pair of sintered powdered material parts, generally designated 10 and 12, which are to be assembled into the coupled unit 14 shown in FIGURE 4 by the use of a deformable tubular coupling member 16, preferably of a strong yet deformable metal such as steel. The parts 10 and 12 are similar in construction and are prepared in a similar manner, hence a single description will suffice. The tubular coupling member 16 is preferably in the form of a relatively thin steel bushing or sleeve of sufficient ductility to undergo the necessary deformation without causing cracking of the parts 10 and 12.

Figure 1:
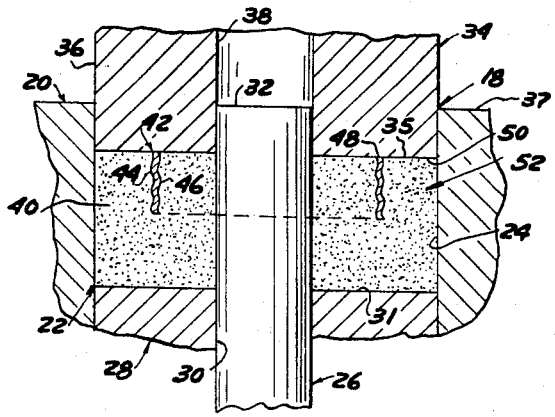
FIGURE 1 is a diagrammatic vertical longitudinal section through the mold cavity of a briquetting press, showing a fusible core of undulatory or zigzag configuration embedded in a powdered material fill subsequent to briquetting.

In preparing either of the parts 10 or 12, use is made of a conventional briquetting press shown diagrammatically at 18 in FIGURE 1 and essentially including a die 20 containing a die cavity 22 with a bore 24 through which projects a core rod 26. For purposes of illustration but not limitation, the die cavity 22 is shown as being of cylindrical form containing a vertically-movable punch 28 with a bore 30 through which the core rod 26 projects. The top surface 31 of the lower punch 28 forms the bottom of the die cavity 22 and has a cylindrical side surface 33 which telescopes with the die cavity bore 24. The core rod 26 has a top surface 32 which is preferably on the same level as the top surface 37 of the die 20 so as to facilitate filling the die cavity 22 with powdered material, as described below. Movable into and out of the die cavity 22 is a punch 34 having a lower pressing surface 35 and an outer cylindrical surface 36 entering and telescoping with the side wall surface 28 of the die cavity 22 and having a central bore 38 adapted to receive the upper portion of the core rod 26 as the punch 34 descends. It is understood that the die 30 is mounted on a die table which may either be fixed or cushioned while the upper punch 34 is connected to and extends downwardly from the vertically-movable press platen (not shown) and the lower punch 28 is connected to conventional raising and lowering mechanism (not shown).

In the preparation of the part 10 or 12 to be coupled, with the punch 34 raised out of the die cavity 22, the operator fills the die cavity 22 with a charge 40 of sinterable powdered material, such as powdered iron or nylon, and embeds in it a tubular insert, generally designated 42, of open-centered orbital outline and of undulatory or zigzag longitudinal section, having alternating convex and concave undulations or corrugations 44 and 46 in a longitudinal direction axially of the core rod 26 and die cavity 22. The insert 42 is made of fusible material having a lower melting point than the powdered material charge 40, for example, copper or copper-zinc alloy, and has opposite ends 48. The thicknesses of the inserts 42 are less than their axial lengths so as to produce recesses of greater depths than widths in order to enhance their gripping power upon the coupling member 16.

The operator now operates the briquetting press to cause the punch 34 to descend and enter the die cavity 22 with its lower pressing surface 35 pressing downward upon the powdered material charge 40 and at the same time pushing downward upon the upper end 48 of the insert 42 until the powdered material charge 40 has been compressed to the desired density and the insert 42 has become seated therein with its upper end 48 level or flush with the top face 50 of the thereby-produced briquette, generally designated 52. The top faces 50 of the two briquettes 52 for producing the parts 10 and 12 are of mating corresponding configurations so as to fit snugly against one another when assembled into the composite workpiece 14.

The operator then operates the press to retract the upper punch 34 upward out of the die cavity 22 and then operates the raising and lowering mechanism to move the lower punch 28 upward until its upper surface 31 reaches the level of the upper surface 37 of the die 20, thereby ejecting the briquette 52. Meanwhile, the core rod 26 remains stationary as the lower punch 28 and upper punch 34 slide upward along it.

Figure 2:
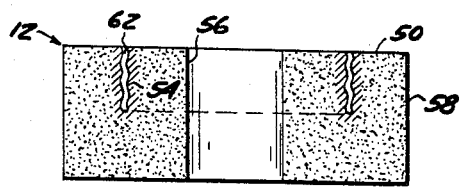
FIGURE 2 is a central vertical section through the briquette of FIGURE 1, after sintering and infiltration of the core.

The thus-compressed briquette 52 with the insert 42 embedded therein with its upper end 48 level with the upper surface 50 of the briquette 52 is then transferred to a conventional sintering furnace and there subjected to sintering heat in the usual manner. This heat causes the particles of the powdered material in the briquette 52 to coalesce, while at the same time the tubular insert 42, being of a lower melting temperature, melts and infiltrates into the pores of the now sintered powdered material to form the part 10 or 12 containing a recess or cavity 54 in the form of a tubular groove of approximately uniform width substantially throughout its depth and of undulatory or zigzag longitudinal section corresponding in shape to the shape of the insert 42 before melting (FIGURE 2) and substantially perpendicular to the upper surface 50. The core rod 26 during the briquetting operation has provided the body 10 or 12 with a central bore 56 while the die cavity bore 24 has provided it with a cylindrical outer surface 58. The preparation of the second component or part 10 or 12 to be united with the part 10 or 12 by the coupling operation and means described below is prepared in the same manner and by the use of a similar insert 42.

The two sintered powdered material parts 10 and 12 to be coupled to one another are then placed with their recesses 54 in vertical or axial alignment with one another (FIGURE 3) with the deformable tubular coupling member 16 aligned at its opposite ends 60 with the mouths 62 of the recesses 54. The assembly shown in FIGURE 3 is then placed in a press with the lower part 12 resting upon the press bed. The press platen is then moved downward, pushing the upper part 10 downward toward the lower part 12 and at the same time causing the upper and lower end portions 60 of the coupling member 16 to enter and push their way into the undulatory recesses 54, thereby assuming the undulatory or zigzag longitudinal sectional form of the recesses 54. The pressing operation is continued until the upper and lower parts 10 and 12 abut one another, as shown in FIGURE 4, whereupon the coupling member 16, now deformed into undulatory or zigzag shape by the pressing operation, becomes firmly united mechanically with the undulatory or zigzag recesses 54. As a result, if ordinary tension is applied to the parts 10 and 12 in the attempt to pull them apart, the undulatory or zigzag deformed coupling member 16 now resists withdrawal from the recesses 54 and prevents separation of the parts 10 and 12.

For simplicity of disclosure and understanding, the two component parts are shown as simple cylindrical blocks, whereas in actual practice they would possess other shapes ususally differing from one another and enabling the making of complexly-shaped workpieces in two or more parts which could not be conveniently produced in a single piece, if at all, by powder metallurgy.

The modified coupled sintered powdered material unit, generally designated 70, shown in FIGURES 5 to 8 inclusive and particularly in FIGURE 8, includes a pair of sintered powdered material parts or components 72 and 74 respectively which are held together by a deformable coupling member 76 of suitable material, such as soft steel. The component parts 72 and 74 are of similar construction but with slightly different coupling recesses. As before, use is made of the same type of briquetting press 18 as shown and described in connection with FIGURE 1, and hence requiring no additional description.

In the preparation of the component parts 72 and 74, with the punch 34 raised out of the die cavity 22, the operator places on top of the lower punch 28 an insert 77 of fusible material having a lower melting point than the powdered material charge 78, for example copper or copper-zinc alloy. The insert 77 has a cylindrical portion 80 and a frusto-conical portion 82. The operator then fills the die cavity with the charge 78 of sinterable powdered material, such as powdered iron or powdered nylon, then operates the briquetting press 18 to cause the punch 34 to descend and enter the die cavity, compressing the powdered material charge 78 around the insert 77. He then retracts the upper punch 34 and raises the lower punch 28 to eject the briquette, generally designated 84.

In a similar manner, the operator prepares the briquette 86 from the use of a similarly fusible insert 88 placed in the die cavity 22 on top of the lower punch 28 and surrounds it with a similar sinterable powdered material charge 90. As before, the insert or core 88 consists of a fusible material which melts at a lower temperature than the powdered material charge 90, such as copper or copper-zinc alloy, and in this instance has a cylindrical portion 92 and an outwardly-flared portion 94. As before, after pressing the charge 90 by lowering the punch 34 into the die cavity 22, the operator retracts the upper punch 94 and raises the lower punch 28 to eject the briquette 86. He then places the briquettes 84 and 86 in a conventional sintering furnace and subjects them to a sintering heat, causing the particles of the powdered material charges 78 and 90 to coalesce while at the same time the inserts or cores 77 and 88 melt and infiltrate into the pores of the respective charges 78 and 90, thereby producing the sintered powdered material components 72 and 74 with annular recesses or cavities 96 and 98 respectively. The recess 96 has an outer cylindrical portion 100 and an inner inwardly-tapered portion 102, whereas the recess 98 has an outer cylindrical portion 104 and an inner outwardly-flared portion 106.

The components 72 and 74 are then aligned with one another in an arbor press or similar pressing machine, with the coupling sleeve 76 aligned with the mouths of the cylindrical portions 100 and 104 of the respective recesses 96 and 98, whereupon the press platen is caused to move downward, pushing the upper component 72 downward substantially into engagement with the lower component 74. While this is occurring, the opposite end portions of the coupling sleeve 76 pass through the cylindrical portions 100 and 104 of the recesses 96 and 98, and are deflected as they enter and pass through the tapered and flared portions 102 and 106 respectively, following the directions of those portions. The result as shown in FIGURE 8 is the coupled composite member 70 with the coupling member 76 deformed from cylindrical shape of rectilinear cross-section into tapered and flared shape of approximately Z-shaped configuration. Due to the fact that the end poritons 108 and 110 respectively of the now deformed coupling member 76 are inclined either by being tapered toward the axis as in the component 72 or flared away from the axis as in the component 74, it is impossible to separate the components 72 and 74 by the application of tension forces ordinarily encountered.

The further modified coupled sintered powdered material unit, generally designated 120 shown in FIGURE 10 and formed in the manner shown in FIGURE 9, also includes a pair of sintered powdered material parts or components 122 and 124 respectively which are held together by a deformed coupling member 126 of soft steel or other suitable deformable material. In the coupled unit 120, the components 122 and 124 are formed in a manner similar to that of the component 72 of FIGURES 5 and 7, except that the fusible core or insert (not shown) is of hollow tapered or frusto-conical form rather than having a partly cylindrical portion, although such partially cylindrical portion may be used by construction a pair of the briquettes 84 and recessed components 72 in the manner described above. When the charge of sintered powdered material is compressed around the hollow frusto-conical insert to produce a briquette and this briquette is sintered, it produces the component 122 or 124 of coalesced powdered material particles, such as powdered iron or powdered nylon, with a frusto-conical or inwardly-tapered recess 120 or 130 in the form of a tubular groove of approximately uniform width substantially throughout its depth and formed by the infiltration of the fusible insert or core into the ports of the sintered powdered material.

In assembling the recessed components 122 and 124, the operator, as before, places them in alignment in a suitable press, such as an arbor press, with the opposite ends of the hollow cylindrical coupling member or sleeve 126 in alignment with their respective recesses 128 and 130. Operation of the press causes the component 122 to descend substantially into engagement with the component 124, while at the same time the hollow cylindrical coupling member 26 is deflected at its opposite ends by the tapered recesses 128 and 130 so as to become of the V-shaped cross-section shown in FIGURE 10. Subsequent pulling upon the component parts 122 and 124 with the application of ordinary forces is incapable of separating the components 122 and 124 because of the opposite inclinations of the halves 132 and 134 respectively of the coupling member 126.

I claim:

1. A mechanically-coupled composite sintered material workpiece, comprising:
   a pair of component workpiece parts of sintered powdered material disposed substantially in face-to-face relationship and having recesses in the form of tubular coupling grooves of approximately uniform widths substantially throughout their depths and of longitudinally-zigzag configuration disposed in alignment with one another,
   and a tubular coupling member corresponding in configuration to said coupling grooves seated in said recesses in deformed interengagement therewith and extending between said component parts.

2. A mechanically-coupled composite sintered material workpiece, comprising:
   a pair of component workpiece parts of sintered powdered material disposed substantially in face-to-face relationship and having recesses of longitudinally-zigzag configuration disposed in alignment with one another,
   and a coupling member seated in said recesses in deformed interengagement therewith and extending between said component parts,
   the recesses and coupling member being of approximately annular form of roughly Z-shaped cross-section.

3. A mechanically-coupled composite sintered material workpiece, according to claim 2, wherein one of the recesses and the deformed portion of the coupling member therein are of inwardly-tapered configuration and the opposite recess and deformed portion are of outwardly-flared configuration.

4. A mechanically-coupled composite sintered material workpiece, according to claim 1, wherein both of the recesses and the coupling member are of collectively approximately annular form and of roughly V-shaped cross-section.

5. A mechanically-coupled composite sintered material workpiece, according to claim 4, wherein both of the recesses and the coupling member are of inwardly-tapered form.

References Cited
UNITED STATES PATENTS

| | | | |
|---|---|---|---|
| 1,367,134 | 2/1921 | Hatchmann | 29—505 |
| 2,863,185 | 12/1958 | Riedi. | |
| 2,991,899 | 7/1961 | Montalbano | 220—4 |

CARL W. TOMLIN, *Primary Examiner.*

WAYNE L. SHEDD, *Assistant Examiner.*